(12) United States Patent
Seeger et al.

(10) Patent No.: US 6,423,131 B1
(45) Date of Patent: *Jul. 23, 2002

(54) BISMUTH VANADATE PIGMENTS COMPRISING AT LEAST ONE METAL FLUORIDE COATING

(75) Inventors: Oliver Seeger, Mannheim; Hansulrich Reisacher, Maxdorf; Norbert Mronga, Dossenheim; Reinhard Zickgraf, Waldsee, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/388,578

(22) Filed: Sep. 2, 1999

(30) Foreign Application Priority Data

Sep. 3, 1998 (DE) .......................................... 198 40 156

(51) Int. Cl.[7] .................................................. C09C 1/00
(52) U.S. Cl. ........................ 106/479; 428/403; 428/404
(58) Field of Search ................................. 106/419, 425, 106/427, 461, 462, 479; 428/403, 404

(56) References Cited

U.S. PATENT DOCUMENTS

| 4,063,956 A | 12/1977 | Higgins ................... 106/288 B |
| 4,115,141 A | 9/1978 | Piltingsrud .............. 106/288 B |
| 4,455,174 A | 6/1984 | Wienand et al. ........ 156/288 B |
| 4,752,460 A | 6/1988 | Herren ........................ 423/593 |
| 4,851,049 A | 7/1989 | Wienand et al. ............. 106/479 |
| 5,123,965 A | 6/1992 | Herren et al. ................ 106/462 |
| 5,536,309 A | 7/1996 | Etzrodt et al. .............. 106/479 |
| 5,753,028 A | 5/1998 | Ochmann et al. ........... 106/479 |
| 5,853,472 A | * 12/1998 | Erkens et al. ............... 106/479 |

FOREIGN PATENT DOCUMENTS

| DE | 195 29 837 | 2/1997 |
| EP | 0 271 813 | 6/1988 |
| EP | 0 640 566 | 3/1995 |

\* cited by examiner

*Primary Examiner*—C. Melissa Koslow
(74) *Attorney, Agent, or Firm*—Oblon, Spivak, McClelland, Maier & Neustadt, P.C.

(57) ABSTRACT

Bismuth vanadate pigments comprising at least one coating containing calcium fluoride, bismuth oxyfluoride or a lanthanide fluoride or oxyfluoride or a mixture thereof are useful for coloring paints, printing inks and plastics.

9 Claims, No Drawings

BISMUTH VANADATE PIGMENTS COMPRISING AT LEAST ONE METAL FLUORIDE COATING

BACKGROUND OF THE INVENTION

1. Field of the Invention

The present invention relates to bismuth vanadate pigments comprising at least one coating containing calcium fluoride, bismuth oxyfluoride or a lanthanide fluoride or oxyfluoride or a mixture thereof.

This invention further relates to the use of these bismuth vanadate pigments for coloring paints, printing inks and plastics.

2. Description of the Background

Bismuth vanadate pigments are well known. As well as the pure $BiVO_4$ pigment, there are a number of $BiVO_4$ pigments in which some of the metal and/or oxygen atoms are replaced by other metals and/or nonmetals. These pigments are useful nontoxic yellow pigments and are particularly suitable for coloring paints and plastics. To improve their application properties, especially their thermal stability, their weatherfastness and their resistance to chemicals, bismuth vanadate pigments are frequently provided with protective coats of metal oxides (including silicates) and/or protective coats of phosphates with or without fluoride.

For instance, U.S. Pat. No. 4,063,956 discloses coating monoclinic bismuth vanadate with a first metal oxide hydrate layer (e.g., aluminum oxide hydroxide) and a second dense layer of amorphous silicon dioxide. In U.S. Pat. No. 4,115,141, bismuth vanadate is stabilized by coating with silicon dioxide or aluminum phosphate.

Combined oxide coatings are also described in U.S. Pat. No. 4,455,174, where bismuth vanadate pigments of the composition $BiVO_4 \cdot x\ Bi_2MoO_6 \cdot y\ Bi_2WO_6$ (x=0.6–2.25, y=0–0.1) are coated first with zirconium dioxide and then with silicon dioxide. In U.S. Pat. No. 4,752,460, doped tetragonal bismuth vanadate pigments of the type $(Bi,A)(V,D)O_4$ (A=Mg, Ca, Sr, Ba, Zn; D=Mo and/or W; molar ratio of A:Bi=0.1–0.4 and D:V=0–0.4) are coated first with silicon dioxide and then with aluminum oxide.

U.S. Pat. No. 5,123,965 describes coating doped tetragonal bismuth vanadate pigments with aluminum phosphate, calcium phosphate, titanium phosphate and mixtures of zinc phosphate and the phosphate of aluminum, of magnesium, of zirconium, of titanium or of calcium. Fluoride ions may be present during the coating with aluminum phosphate.

Fluoridic metal oxide coatings based on silicon dioxide, magnesium silicate and magnesium fluoride are finally known from EP-A-271 813, where bismuth vanadate pigments of the formula $BiVO_4 \cdot x\ Bi_2MoO_6$ (x=0.2–0.25) are coated with this mixed layer and additionally with a wax layer.

However, the known coatings do not always lead to bismuth vanadate pigments having satisfactory properties.

SUMMARY OF THE INVENTION

It is an object of the present invention to provide bismuth vanadate pigments having good application properties, especially good stabilities, for example good weatherfastness.

We have found that this object is achieved by bismuth vanadate pigments comprising at least one coating containing calcium fluoride, bismuth oxyfluoride or a lanthanide fluoride or oxyfluoride or a mixture thereof.

This invention also provides for the use of these bismuth vanadate pigments for coloring paints, printing inks and plastics.

DETAILED DESCRIPTION OF THE INVENTION

The bismuth vanadate pigments of the invention may be based on any known bismuth vanadate pigment, including those mentioned above. Further examples of suitable base pigments are the doped bismuth vanadate pigments described in EP-A-640 566 and DE-A-195 29 837.

The bismuth vanadate pigments of the invention are coated at least with a metal fluoride layer consisting essentially of calcium fluoride, bismuth oxyfluoride or a lanthanide fluoride or oxyfluoride, preferably lanthanum fluoride, lanthanum oxyfluoride, cerium fluoride, cerium oxyfluoride, yttrium fluoride or yttrium oxyfluoride. The fluorides (and/or oxyfluorides) mentioned may be present together in one and the same layer, but the separate application of layers each containing only one fluoride is preferred.

Particular preference is given to calcium fluoride layers and bismuth oxyfluoride layers, although calcium fluoride layers are preferably combined with further stabilizing coatings.

Thus, the metal fluoride coating of the invention may with advantage be combined with metal oxide coatings and/or metal phosphate coatings, in which case combinations of metal fluoride layers and metal oxide layers are preferred. In general, the layers are applied sequentially, but a certain degree of intermixing of the layers cannot be ruled out, especially in the case of the same layer type (fluoride, oxide or phosphate). Preferably, the metal fluoride coating(s) is or are applied to the bismuth vanadate pigment as the innermost layer in the case of multiple coating. However, the sequence of coats may also be changed.

Preferred materials for the metal oxide coatings are oxides and oxide hydrates of alkaline earth metals, especially magnesium, calcium, strontium and barium, of aluminum, silicon, tin, titanium, zirconium, hafnium, niobium, tantalum, zinc and of lanthanide metals, especially lanthanum, cerium and yttrium. Mixed oxides of these metals, especially the metal silicates, are particularly suitable. These compounds may likewise be present together in one and the same layer.

Examples of particularly preferred oxides are aluminum oxide, aluminum oxide hydrate, cerium dioxide and silicon dioxide and also the calcium silicates $CaSiO_3$ and $Ca_2SiO_5$, of which $CaSiO_3$ and silicon dioxide are most preferred. Where a metal oxide layer is present as outer layer, a silicon dioxide layer is particularly favorable.

Preferred materials for the metal phosphate coatings are the phosphates, especially the orthophosphates, of alkaline earth metals, especially magnesium and calcium, of zinc and of aluminum, which may also be present mixed in one and the same layer, this being preferred for the alkaline earth metals and zinc.

The bismuth vanadate pigments of the invention may have any number of coats. The number of coats is preferably within the range from one to four. Examples of particularly preferred coats are single coats of bismuth oxyfluoride and combination coats of calcium fluoride, calcium metasilicate and silicon dioxide or of bismuth oxyfluoride, calcium fluoride, calcium metasilicate and silicon dioxide. Further suitable combinations may be found in the Examples.

Depending on the particle size and the specific surface area of the bismuth vanadate used, the stabilized bismuth vanadate pigments of the invention generally contain from 2 to 40% by weight, preferably from 4 to 20% by weight of coating material, based on the weight of the coated pigment. The fluoride content is generally within the range from 0.05 to 10% by weight, preferably within the range from 1 to 5% by weight, based on the weight of the coated pigment.

The bismuth vanadate pigments of the invention are notable for their high stability, especially their very good weatherfastness and low photochromism. Photochromism is the reversible transformation of a compound into another of different color (absorption spectrum) due to visible or ultraviolet light. The measure of photochromism employed herein is the CIELAB ΔE total color difference. The bismuth vanadate pigments of the invention also have excellent acid stability when coated with a bismuth oxyfluoride layer.

However, the bismuth vanadate pigments of the invention are not just convincing with regard to their stability, but surprisingly also have excellent color properties, especially high chroma and lightness.

To prepare the bismuth vanadate pigments of the invention, the coatings are advantageously precipitated wet-chemically onto the selected base pigment.

To deposit the metal fluoride layer, a suspension of the substrate (which can be an uncoated bismuth vanadate pigment or a bismuth vanadate pigment already coated with metal oxide or metal phosphate), a solution of a calcium, bismuth or lanthanide metal salt and a solution comprising fluoride ions are thoroughly mixed, preference being given to the use of aqueous solutions and suspensions.

Processwise it is possible to proceed in various ways: The substrate suspension can be introduced as initial charge and the calcium, bismuth or lanthanide metal salt solution and the fluoride ion solution added at the same time. However, it is also possible to introduce the fluoride ion solution as initial charge together with the substrate suspension and to add the calcium, bismuth or lanthanide metal salt solution, or vice versa to introduce the calcium, bismuth or lanthanide metal salt solution as initial charge together with the substrate suspension and to add the fluoride ion solution.

The pH of the mixture during the addition of the calcium, bismuth or lanthanide metal salt solution and/or the fluoride ion solution is advantageously maintained within the range from 2 to 11, preferably within the range from 5 to 9.

The temperature during the precipitation can be within the range from room temperature to the boiling point of the mixture (reflux temperature). A temperature within the range from 20 to 80° C. is preferred.

When coating with metal oxide layers is desired, it is possible to proceed in a conventional manner by mixing the substrate suspension (uncoated or precoated bismuth vanadate pigment) with a preferably aqueous solution of a salt of the respective metal and precipitating the oxide or oxide hydrate onto the substrate while maintaining a pH which is customarily within the range from 3 to 10, preferably within the range from 5 to 9.

Metal phosphate layers can be similarly deposited in a likewise known manner by mixing the substrate suspension with the corresponding metal salt solution(s) and a phosphate ion solution while maintaining a pH within the range from 3 to 10 in general, but preferably within the range from 5 to 9.

To prepare the metal salt solutions required for the precipitation reactions, it is possible in principle to use any salt of the metals with inorganic or organic acids which is soluble in water (by addition of an acid, if necessary).

Examples of preferred metal salts are calcium nitrate, calcium sulfate, calcium chloride, magnesium nitrate, magnesium sulfate, magnesium chloride, aluminum sulfate, aluminum nitrate, sodium aluminate, aluminum acetate, alkali metal silicates such as sodium silicate and potassium silicate, zinc nitrate, zinc sulfate, zinc chloride, bismuth nitrate, cerium nitrate, cerium ammonium nitrate, cerium sulfate, cerium chloride, lanthanum nitrate, lanthanum sulfate, lanthanum chloride, yttrium nitrate, yttrium sulfate and yttrium chloride.

The fluoride ion solutions are preferably prepared from alkali metal fluorides, ammonium fluorides or complex fluoride-containing salts. Examples of particularly suitable fluorides are: sodium fluoride, potassium fluoride, potassium hydrogendifluoride, ammonium fluoride, ammonium hydrogenfluoride, sodium tetrafluoroborate and ammonium tetrafluoroborate.

Examples of preferred phosphate ion solutions are solutions of alkali metal phosphates and hydrogenphosphates, especially sodium phosphate and potassium phosphate, and especially phosphoric acid.

After the last layer has been deposited, or on completion of the last addition, the suspension is generally stirred for from 1 to 5 h. The coated bismuth vanadate pigment may then, optionally after cooling to room temperature, be isolated in a conventional manner by filtration, washing and drying.

If desired, the coated bismuth vanadate pigment may be subjected to a grinding operation. Preference is given to a wet-grinding operation, which is preferably inserted after the washing of the pigment.

Tinctorially particularly useful bismuth vanadate pigments of high chroma and lightness are obtained on subjecting the pigment to a thermal treatment.

The point in time at which the thermal treatment is carried out is generally immaterial. It is possible to heat-treat either the uncoated base pigment in a conventional manner following its synthesis or the coated pigment after drying.

To heat-treat the dried coated pigment, it is generally heated to >300° C., preferably to 350–700° C., for 0.5–20 h.

The heat-treated coated pigment is advantageously then subjected to a wet-grinding operation. In this case, there is of course no need to grind the pigment after coating.

If desired, the bismuth vanadate pigments according to the invention may be additionally coated with organic additives in order, for example, that their dispersibility in paint systems may be improved.

Bismuth vanadate pigments of the invention are very useful for coloring paints, printing inks and plastics.

EXAMPLE

Preparation and assessment of bismuth vanadate pigments of the invention

The tinctorial properties and the photochromism were assessed on paint films prepared as follows. A mixture of 15 g of each pigment and 35 g of alkyd-melamine baking varnish was shaken on a Skandex machine for 60 min with 70 g of glass beads (1 mm in diameter), then hidingly applied to sheet aluminum bearing a black and white coating, flashed off and baked at 130° C. for 30 min.

To evaluate the photochromism, the paint films were each half-covered with a metal stencil and then irradiated for 2 h with an NXe 1500B xenon lamp (from Original, Hanau). The ΔE values were determined by measuring the irradiated and nonirradiated parts of the paint films using a Zeiss RFC 16 spectrophotometer after storage of the sample in the dark for 30 minutes.

The weatherfastnesses were evaluated in the masstone by means of accelerated weathering for 80 days in a Xenotest 1200 with turnaround run (from Heraeus) in accordance with DIN 53387. The evaluation was undertaken in accordance with DIN EN 20105-A02 (gray scale for assessing change in color). The assessment scale ranges from 0 (miserable weatherfastness) to 5 (excellent weatherfastness).

To determine the CIELAB values of hue H[°], chroma C* and lightness L*, the paint films obtained were measured using the abovementioned spectrophotometer. The values obtained are tabulated below.

Example 1 a) To a mixture of 1000 g of water, 418 g of aqueous sodium vanadate solution (7% by weight of vanadium) and 5.5 g of 85% strength by weight phosphoric acid were added with stirring 1130 g of aqueous bismuth nitrate solution (11.05% by weight of bismuth) over 30 min. The pH of the mixture was then adjusted with 30% strength by weight sodium hydroxide solution to 4.5 over 1 h and then with 5% strength by weight sodium hydroxide solution to 5 over 10 min.

The resulting suspension was then heated to 95° C. while maintaining pH 5. After about 40 min, the suspension turned deep yellow, and the pH rose briskly to 8.1. The suspension was stirred at 95° C. to constant pH.

After cooling down to room temperature, the product was filtered off, washed salt-free and kept in the form of a press cake (solids content: from 20 to 30% by weight; in the present case: 23.8% by weight) until needed for further processing.

The bismuth vanadate pigment obtained had a bismuth content of 63.0% by weight and a vanadium content of 14.9% by weight.

b) The bismuth vanadate pigment obtained in a) was, after drying, heat-treated at 450° C. for 1 h. Thereafter the pigment was subjected to a wet-grinding operation in the presence of water to an average particle size of 0.8 μm and dried at 100° C. in a through-circulation drying cabinet.

The uncoated bismuth vanadate pigment obtained scored a rating of 3 in the accelerated weathering test; its photochromism ΔE was 2.5.

Example 2

A suspension in 875 ml of water of 1100 g of a bismuth vanadate press cake prepared similarly to Example 1a) (solids content 23.8% by weight) was admixed at room temperature with a solution of 28.7 g of potassium fluoride in 325 ml of water and a solution of 116 g of calcium nitrate tetrahydrate in 1 l of water which were added dropwise concurrently over 2.5 h with stirring. On completion of the addition of the solutions the suspension pH was 5.8.

The suspension was heated to 80° C. and 1050 ml of sodium silicate solution (15 g of Si/l) were added over 1.5 h. The pH rose to 8.2.

After stirring at 80° C. for one hour and subsequent cooling down to room temperature, the coated pigment was filtered off, washed with water, dried at 110° C. in a through-circulation drying cabinet and heat-treated at 400° C. for 1 h. Thereafter the pigment was subjected to a wet-grinding operation to an average particle size of 0.8 μm and dried at 100° C. in a through-circulation drying cabinet.

The resulting $CaF_2/CaSiO_3/SiO_2$ coated bismuth vanadate pigment had a calcium content of 4.7% by weight, a silicon content of 4.3% by weight and a fluoride content of 2.7% by weight and scored a rating of 5 in the accelerated weathering test; its photochromism ΔE was 0.6.

Example 3

To a suspension in 450 ml of water of 117 g of a bismuth vanadate pigment prepared similarly to Example 1b) were added 10.8 g of potassium fluoride. The stirred suspension was heated to 80° C. and brought to pH 6. by addition of 10% strength by weight nitric acid and 55 g of aqueous bismuth nitrate solution (23.7% by weight of bismuth) were added over 45 min, during which the pH was maintained at 6 by the simultaneous addition of 30% strength by weight sodium hydroxide solution.

After stirring at 80° C. for one hour and subsequently cooling down to room temperature, the coated pigment was filtered off, washed with water, subjected to a wet-grinding operation to an average particle size of 0.8 μm and dried in a through-circulation drying cabinet at 100° C.

The resulting BiOF coated bismuth vanadate pigment had a fluoride content of 0.84% by weight and scored a rating of 4–5 in the accelerated weathering test; its photochromism ΔE was 0.7.

Example 4

A suspension in 220 ml of water of 272 g of a bismuth vanadate press cake prepared similarly to Example 1a) (solids content 27.5% by weight) was admixed at room temperature with a solution of 8.2 g of potassium fluoride in 325 ml of water and a solution of 33 g of calcium nitrate tetrahydrate in 325 l of water which were added dropwise over 2 h with stirring. On completion of the addition of the solutions the suspension pH was 5.8.

The suspension was refluxed for two hours and then cooled down to 80° C., at which point 79 ml of a 6.75% strength by weight aqueous zinc nitrate solution and 78 ml of 3.4% strength by weight phosphoric acid were added in parallel over 30 min, during which the pH was maintained at 5.8 by simultaneous addition of 10% strength by weight aqueous sodium carbonate solution.

After stirring at 80° C. for one hour and subsequent cooling down to room temperature, the coated pigment was filtered off, washed with water, dried at 110° C. in a through-circulation drying cabinet and heat-treated at 400° C. for 1 h. Thereafter the pigment was subjected to a wet-grinding operation to an average particle size of 0.8 μm and dried at 110° C. in a through-circulation drying cabinet.

The resulting $CaF_2/(Ca,Zn)_3(PO_4)_2$ coated bismuth vanadate pigment had a calcium content of 4.1% by weight, a zinc content of 2.1% by weight, a phosphorus content of 1.0% by weight and a fluoride content of 3.0% by weight and scored a rating of 4–5 in the accelerated weathering test; its photochromism ΔE was 1.1.

Example 5

A suspension in 220 ml of water of 270 g of a bismuth vanadate press cake prepared similarly to Example 1a) (solids content 27.5% by weight) was admixed at room temperature with a solution of 8.2 g of potassium fluoride in 325 ml of water and a solution of 33 g of calcium nitrate tetrahydrate in 325 ml of water which were added dropwise concurrently over 2 h with stirring. On completion of the addition of the solutions the suspension pH was 5.8.

The suspension was heated to reflux temperature and 150 ml of sodium silicate solution (15 g of Si/l) were added over 1.5 h. The pH rose to 6.4.

The suspension was subsequently stirred at 80° C. for half an hour and brought to pH 5.8 by addition of 25% strength by weight nitric acid, at which point 79 ml of a 6.75% strength by weight aqueous zinc nitrate solution and 78 ml of 3.4% strength by weight phosphoric acid were added in parallel over 30 min, during which the pH was maintained at 5.8 by simultaneous addition of 10% strength by weight aqueous sodium carbonate solution.

After stirring at 80° C. for one hour and subsequent cooling down to room temperature, the coated pigment was filtered off, washed with water, dried at 110° C. in a through-circulation drying cabinet and heat-treated at 450° C. for 1 h. Thereafter the pigment was subjected to a wet-grinding operation to an average particle size of 0.8 $\mu$m and dried at 100° C. in a through-circulation drying cabinet.

The resulting $CaF_2/CaSiO_3/SiO_2/Zn_3(PO_4)_2$ coated bismuth vanadate pigment had a calcium content of 2.8% by weight, a zinc content of 1.8% by weight, a phosphorus content of 0.8% by weight and a fluoride content of 2.8% by weight and scored a rating of 4–5 in the accelerated weathering test; its photochromism $\Delta E$ was 1.1.

Example 6

100 g of a bismuth vanadate pigment prepared similarly to Example 1b) were suspended in 725 ml of water, the suspension was heated to 80° C. with stirring, and 110 g of a 7.5% strength by weight aqueous aluminum nitrate solution were added over 40 min, during which the pH was maintained at 6.2 by simultaneous addition of 10% strength by weight aqueous sodium carbonate solution.

After cooling to 70° C., a solution of 10.9 g of potassium fluoride in 440 ml of water and a solution of 44.4 g of calcium nitrate tetrahydrate in 440 ml of water were added dropwise in parallel with stirring over 90 min. On completion of the addition of the solutions the suspension pH was 6.2.

Following renewed heating to 80° C., 106 g of a 6.75% strength by weight aqueous zinc nitrate solution and 104 g of 3.4% strength by weight phosphoric acid were added in parallel over 35 min, during which the pH was maintained at 5.8 by simultaneous addition of 10% strength by weight aqueous sodium carbonate solution.

After stirring at 80° C. for half an hour and subsequent cooling down to room temperature, the coated pigment was filtered off, washed with water, subjected to a wet-grinding operation to an average particle size of 0.8 $\mu$m and dried at 110° C. in a through-circulation drying cabinet.

The resulting $AlO(OH)/CaF_2/(Ca,Zn)_3(PO_4)_2$ coated bismuth vanadate pigment had an aluminum content of 0.9% by weight, a calcium content of 3.7% by weight, a zinc content of 1.9% by weight, a phosphorus content of 1.0% by weight and a fluoride content of 3.0% by weight and scored a rating of 4–5 in the accelerated weathering test; its photochromism $\Delta E$ was 1.1.

Example 7

276 g of a bismuth vanadate press cake prepared similarly to Example 1a) (solids content 27.1% by weight) were suspended in 300 ml of water, the suspension was heated with stirring to reflux temperature, and 300 ml of sodium silicate solution (15 g of Si/l) were added over 1 h, during which the pH was maintained at 8.8 by simultaneous addition of 25% strength by weight nitric acid.

After refluxing with stirring for one hour and subsequent cooling to 55° C., a solution of 8.2 g of potassium fluoride in 325 ml of water and a solution of 33.2 g of calcium nitrate tetrahydrate in 325 ml of water were added dropwise in parallel with stirring over 75 min. On completion of the addition of the solutions the suspension pH was 5.5.

After stirring at 55° C. for one hour and cooling down to room temperature, the coated pigment was filtered off, washed with water, dried at 110° C. in a through-circulation drying cabinet and heat-treated at 450° C. for 1 h. Thereafter the pigment was subjected to a wet-grinding operation to an average particle size of 0,8 $\mu$m and dried at 100° C. in a through-circulation drying cabinet.

The resulting $SiO_2/CaF_2$ coated bismuth vanadate pigment had a calcium content of 2.8% by weight, a silicon content of 4.4% by weight and a fluoride content of 2.6% by weight and scored a rating of 4–5 in the accelerated weathering test; its photochromism $\Delta E$ was 1.2.

Example 8

To a suspension in 300 ml of water of 276 g of a bismuth vanadate press cake prepared similarly to Example 1a) (solids content 27.1% by weight) were added a solution of 0.8 g of potassium fluoride in 50 ml of water, a solution of 3.3 g of calcium nitrate tetrahydrate in 50 ml of water and 300 ml sodium silicate solution (15 g of Si/l) dropwise in parallel at room temperature with stirring over 60 min, during which the pH was maintained at 8.8 by simultaneous addition of 25% strength by weight nitric acid.

After heating to reflux temperature, stirring at that temperature for one hour and cooling down to room temperature, the coated pigment was filtered off, washed with water, dried at 110° C. in a through-circulation drying cabinet and heat-treated at 450° C. for 1 h. Thereafter the pigment was subjected to a wet-grinding operation to an average particle size of 0.8 $\mu$m and dried at 100° C. in a through-circulation drying cabinet.

The resulting $CaF_2/CaSiO_3/SiO_2$ coated bismuth vanadate pigment had a calcium content of 0.74% by weight, a silicon content of 4.6% by weight and a fluoride content of 0.1% by weight and scored a rating of 4–5 in the accelerated weathering test; its photochromism $\Delta E$ was 1.1.

Example 9 a) To a mixture of 1000 g of water, 411 g of aqueous sodium vanadate solution (7% by weight of vanadium) and 10 g of 85% strength by weight phosphoric acid were added with stirring initially over 60 min 488 g of aqueous bismuth nitrate solution (24% by weight of bismuth) and then 2.2 g of calcium hydroxide and 2.3 g of zinc oxide.

The pH of the mixture was then adjusted with 30% strength by weight sodium hydroxide solution to 4.5 over 2 h and subsequently with 5% strength by weight sodium hydroxide solution to 4.7 over 6 min.

The resulting suspension was then heated to 95° C. while maintaining pH 4.7. After about 2 h, the suspension turned deep yellow, and the pH rose briskly to 7.9. The suspension was stirred at 95° C. to constant pH.

After cooling down to room temperature, the product was filtered, washed salt-free and kept in the form of a press cake (solids content: from 20 to 35% by weight; in the present case: 28.2% by weight) until needed for further processing.

The doped bismuth vanadate pigment obtained had a bismuth content of 61.0% by weight, a vanadium content of 14.8% by weight, a calcium content of 0.6% by weight, a zinc content of 0.9% by weight and a phosphorus content of 0.8% by weight.

b) The doped bismuth vanadate pigment obtained in a) was after drying heat-treated at 450° C. for 1 h. Thereafter the pigment was subjected to a wet-grinding operation in the presence of water to an average particle size of 0.8 μm and dried at 100° C. in a through-circulation drying cabinet.

The uncoated bismuth vanadate pigment obtained scored a rating of 3–4 in the accelerated weathering test.

Example 10

A suspension in 700 ml of water of 647 g of a doped bismuth vanadate press cake prepared similarly to Example 9a) (solids content 30.9% by weight) was admixed at room temperature with a solution of 21.9 g of potassium fluoride in 325 ml of water and a solution of 89 g of calcium nitrate tetrahydrate in 900 ml of water which were added dropwise over 75 min with stirring. On completion of the addition of the solutions the suspension pH was 7.1.

The suspension was heated to reflux temperature and 800 ml of sodium silicate solution (15 g of Si/l) were added over 1 h. The pH rose to 8.2.

After stirring at that temperature for half an hour and subsequent cooling down to room temperature, the coated pigment was filtered off, washed with water, dried at 110° C. in a through-circulation drying cabinet and heat-treated at 450° C. for 1 h. Thereafter the pigment was subjected to a wet-grinding operation to an average particle size of 0.8 μm and dried at 100° C. in a through-circulation drying cabinet.

The resulting $CaF_2/CaSiO_3/SiO_2$ coated doped bismuth vanadate pigment had a calcium content of 5.3% by weight, a silicon content of 4.0% by weight and a fluoride content of 2.5% by weight and scored a rating of 5 in the accelerated weathering test.

Example 11

A suspension in 1200 ml of water of 647 g of a doped bismuth vanadate press cake prepared similarly to Example 9a) (solids content 30.9% by weight) was admixed at room temperature with a solution of 4.4 g of potassium fluoride in 325 ml of water and a solution of 8.7 g of calcium nitrate tetrahydrate in 325 ml of water which were added dropwise over 60 min with stirring. On completion of the addition of the solutions the suspension pH was 7.0.

The suspension was heated to reflux temperature and 360 ml of sodium silicate solution (15 g of Si/l) were added over 50 min. The pH rose to 7.9.

Then 219 g of a 7.5% strength by weight aqueous aluminum nitrate solution were added over 45 min, during which the pH was maintained at 6.1 by simultaneous addition of 10% strength by weight aqueous sodium carbonate solution.

After half an hour's stirring at reflux temperature, 164 g of a 5.2% strength by weight aqueous calcium nitrate solution and 157 g of 3.4% strength by weight phosphoric acid were added over 45 min, during which the pH was maintained at 5.8 by simultaneous addition of 10% strength by weight aqueous sodium carbonate solution.

After renewed half an hour's stirring at reflux temperature, 212 g of a 6.75% strength by weight zinc nitrate solution and 207 g of 3.4% strength by weight phosphoric acid were finally added, during which the pH was in turn maintained at 5.8 by simultaneous addition of 10% strength by weight aqueous sodium carbonate solution.

After a concluding half an hour's stirring at reflux temperature and cooling down to room temperature, the coated pigment was filtered off, washed with water, dried at 110° C. in a through-circulation drying cabinet and heat-treated at 500° C. for 1 h. Thereafter the pigment was subjected to a wet-grinding operation to an average particle size of 0.8 μm and dried at 100° C. in a through-circulation drying cabinet.

The resulting $CaF_2/SiO_2/AlO(OH)/Ca_3(PO_4)_2/Zn_3(PO_4)_2$ coated doped bismuth vanadate pigment had a calcium content of 2.1% by weight, a silicon content of 1.4% by weight, an aluminum content of 0.9% by weight, a zinc content of 2.9% by weight, a phosphorus content of 2.1% by weight and a fluoride content of 0.6% by weight and scored a rating of 4–5 in the accelerated weathering test.

Example 12

403 g of a doped bismuth vanadate press cake prepared similarly to Example 9a) (solids content 24.8% by weight) were suspended in 400 ml of water, the suspension was heated to 80° C. with stirring, and 103 g of a 5.2% by weight aqueous calcium nitrate solution and 98 g of a 3.4% strength by weight phosphoric acid were added dropwise in parallel over 30 min, during which the pH was maintained at 5.8 by simultaneous addition of a 10% strength by weight aqueous sodium carbonate solution.

After half an hour's stirring and subsequent cooling to 55° C., a solution of 7.8 g of potassium fluoride in 325 ml of water and a solution of 33 g of calcium nitrate tetrahydrate in 325 ml of water were added dropwise in parallel over 45 min. On completion of the addition of the solutions the pH was 7.1.

The suspension was heated to reflux temperature and 300 ml of sodium silicate solution (15 g of Si/l) were added over 1 h. The pH rose to 8.3.

After a concluding half an hour's stirring at reflux temperature and cooling down to room temperature, the coated pigment was filtered off, washed with water, dried at 110° C. in a through-circulation drying cabinet and heat-treated at 450° C. for 1 h. Thereafter the pigment was subjected to a wet-grinding operation to an average particle size of 0.8 μm and dried at 100° C. in a through-circulation drying cabinet.

The resulting $Ca_3(PO_4)_2/CaF_2/CaSiO_3/SiO_2$ coated doped bismuth vanadate pigment had a calcium content of 5.8% by weight, a silicon content of 3.4% by weight, a phosphorus content of 1.5% by weight and a fluoride content of 2.0% by weight and scored a rating of 5 in the accelerated weathering test.

Example 13

50 g of a doped bismuth vanadate pigment prepared similarly to Example 9a) and then dried were heat-treated at 500° C. for 1 h. The cooled pigment was then subjected to a wet-grinding operation in 365 ml of water in the presence of glass balls (0.8 mm in diameter) and then, after removal of the glass balls, admixed with a further 400 ml of water.

To this suspension were added 0.78 g of potassium fluoride. After a pH of 6 had been set by addition of 10% strength by weight nitric acid, 11.6 g of bismuth nitrate solution (23.8% by weight of bismuth) were added at room temperature over 20 min, during which the pH was maintained at 6 by simultaneous addition of 10% strength by weight aqueous sodium carbonate solution.

After stirring for one hour a solution of 2.73 g of potassium fluoride in 150 ml of water and a solution of 11.1 g of calcium nitrate tetrahydrate in 150 ml of water were added dropwise in parallel at room temperature with stirring over 30 min. On completion of the addition of the solutions the suspension pH was 5.4.

The suspension was heated to 80° C. and 100 ml of sodium silicate solution (15 g of Si/l) were added over 1 h. The pH rose to 8.2.

After subsequent stirring at 80° C. for one hour and cooling down to room temperature, the coated pigment was filtered off, washed with water, subjected to a wet-grinding operation to an average particle size of 0.8 μm and dried in a through-circulation drying cabinet at 100° C.

The resulting $BiOF/CaF_2/CaSiO_3/SiO_2$ coated doped bismuth vanadate pigment had a calcium content of 2.7% by weight, a silicon content of 2.1% by weight and a fluoride content of 1.6% by weight and scored a rating of 4–5 in the accelerated weathering test.

TABLE

Colorimetric data of bismuth vanadate pigments prepared

| Example | Hue [° C.] | C* | L* |
|---|---|---|---|
| 1a | 92.9 | 87.7 | 81.7 |
| 1b | 93.5 | 98.2 | 87.7 |
| 2 | 93.6 | 99.1 | 88.9 |
| 3 | 93.5 | 99.3 | 88.3 |
| 4 | 93.4 | 99.3 | 88.9 |
| 5 | 93.4 | 98.8 | 88.4 |
| 6 | 93.4 | 100.1 | 88.9 |
| 7 | 93.4 | 98.7 | 88.3 |
| 8 | 93.0 | 99.9 | 89.0 |
| 9a | 91.3 | 88.2 | 82.0 |
| 9b | 92.6 | 97.7 | 87.2 |
| 10 | 92.6 | 100.1 | 88.7 |
| 11 | 92.4 | 100.0 | 87.7 |
| 12 | 92.5 | 100.0 | 88.4 |
| 13 | 92.9 | 100.3 | 88.4 |

We claim:

1. Bismuth vanadate pigments comprising at least one coating containing calcium fluoride, bismuth oxyfluoride, or a lanthanide fluoride or oxyfluoride, or a mixture thereof, wherein said bismuth vanadate pigments comprising said at least one coating are non-transparent.

2. Bismuth vanadate pigments as claimed in claim 1, further comprising at least one coating containing an oxide or an oxide hydrate of an alkaline earth metal, aluminum, silicon, tin, titanium, zirconium, hafnium, niobium, tantalum, zinc or a lanthanide metal or a mixed oxide of these metals or a mixture thereof.

3. Bismuth vanadate pigments as claimed in claim 1, further comprising at least one coating containing a metal phosphate.

4. Bismuth vanadate pigments as claimed in claim 1, further comprising at least one coating containing an alkaline earth metal phosphate, aluminum phosphate or zinc phosphate or a mixture thereof.

5. Bismuth vanadate pigments as claimed in claim 1, further comprising at least one coating containing a metal oxide and at least one coating containing a metal phosphate.

6. Bismuth vanadate pigments as claimed in claim 1, further comprising at least one coating containing a metal oxide and at least one coating containing an alkaline earth metal phosphate, aluminum phosphate or zinc phosphate or a mixture thereof.

7. A method of coloring paints, printing inks and plastics, which comprises incorporating the bismuth vanadate pigments of claim 1 into said paints, printing inks and plastics.

8. Bismuth vanadate pigments as claimed in claim 1, further comprising at least one coating containing a metal oxide.

9. Bismuth vanadate pigments as claimed in claim 1, which are obtained by coating bismuth vanadate pigments not containing said at least one coating with said at least one coating.

* * * * *